United States Patent
Yang et al.

(10) Patent No.: US 11,137,353 B2
(45) Date of Patent: Oct. 5, 2021

(54) METALLIC MICRO/NANO-STRUCTURE AND OPTICAL FIBER HAVING A MICRO/NANO-STRUCTURE ON THE END-FACET

(71) Applicant: SHANGHAI JIAOTONG UNIVERSITY, Shanghai (CN)

(72) Inventors: Tian Yang, Shanghai (CN); Zeyu Lei, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 405 days.

(21) Appl. No.: 16/331,307

(22) PCT Filed: Sep. 6, 2017

(86) PCT No.: PCT/CN2017/100772
§ 371 (c)(1),
(2) Date: Aug. 22, 2019

(87) PCT Pub. No.: WO2018/041267
PCT Pub. Date: Mar. 8, 2018

(65) Prior Publication Data
US 2019/0391077 A1  Dec. 26, 2019

(30) Foreign Application Priority Data

Aug. 29, 2016 (CN) .......................... 201610754423.1

(51) Int. Cl.
*G01J 3/44* (2006.01)
*G01N 21/552* (2014.01)
(Continued)

(52) U.S. Cl.
CPC ....... *G01N 21/554* (2013.01); *G01N 21/7703* (2013.01); *B82Y 20/00* (2013.01); *G02B 6/02* (2013.01)

(58) Field of Classification Search
CPC ... G01J 3/44; G01J 3/02; G01N 21/65; G01N 21/64; G01N 21/7703; G01N 21/554;
(Continued)

(56) References Cited

U.S. PATENT DOCUMENTS

2012/0048181 A1* 3/2012 Barker ................... B82Y 30/00
117/94

FOREIGN PATENT DOCUMENTS

CN 100552829 C 10/2009
CN 100570756 C 12/2009
(Continued)

*Primary Examiner* — Abdullahi Nur
(74) *Attorney, Agent, or Firm* — Global IP Services; Tianhua Gu

(57) ABSTRACT

Provided are a metallic micro/nano-structure and an optical fiber having it on the end-facet. The metallic micro/nano-structure comprises of a metallic film and a micro/nano pattern in the metallic film. The micro/nano pattern divides the metallic film into a periodic structure and an embedded defect structure; the defect structure locally breaks the periodicity of the periodic structure; in at least one dimension, the periodic structure has a period T satisfying $0.75\lambda < T < 1.25\lambda$, $\lambda$ is a wavelength of a surface plasmon at an interface between the metallic film and a medium; and the surface plasmon resonates within the defect structure and its surrounding area. The optical fiber end-facet device takes the advantages of single-mode optical fiber systems, including stable optical transmission, compact systems and flexible configurations. It achieves high efficiency coupling between fiber guided lightwaves and surface plasmon resonance, using a metallic micro/nano-structure which is a distributed feedback resonant cavity.

23 Claims, 7 Drawing Sheets

(51) Int. Cl.
*G01N 21/77* (2006.01)
*B82Y 20/00* (2011.01)
*G02B 6/02* (2006.01)

(58) Field of Classification Search
CPC ........ B82Y 20/00; G02B 6/02; G02B 6/1226;
G02B 6/02052; G02B 5/00; G02B 5/008;
G02B 6/0229
See application file for complete search history.

(56) References Cited

FOREIGN PATENT DOCUMENTS

| | | |
|---|---|---|
| CN | 106199786 A | 12/2016 |
| JP | 2005308658 A | 11/2005 |
| KR | 101083605 | 11/2011 |

* cited by examiner

METALLIC MICRO/NANO-STRUCTURE AND OPTICAL FIBER HAVING A MICRO/NANO-STRUCTURE ON THE END-FACET

CROSS REFERENCE TO RELATED PATENT APPLICATION

The present application is the US national stage of PCT/CN2017/100772 filed on Sep. 6, 2017, which claims the priority of the Chinese patent application No. 2016107544231, filed on Aug. 29, 2016, which application is incorporated herein by reference.

BACKGROUND OF THE PRESENT DISCLOSURE

Field of Disclosure

The present disclosure relates to the technical field of optics and biosensing, and in particular, to a metallic micro/nano-structure and an optical fiber having a metallic micro/nano-structure on the end-facet.

Description of Related Arts

Surface plasmons are surface waves formed by coupling between surface charge oscillations on metallic surfaces and optical fields. The resonant behaviors of such surface waves, such as the resonant wavelength, the scattering intensity, and the resonant reflection angle, change with the ambient refractive index. Therefore, surface plasmon resonance (SPR) has been used to measure the ambient refractive index, and has been especially widely applied in the field of biosensing. For example, commercial SPR instruments, as represented by the Biacore products, are employed to measure biomolecule interactions and molecular concentrations, which have found a wide range of applications in life science research, drug screening and food industry.

It has long been desired to integrate the SPR devices with the optical fibers, in order to conveniently couple lightwaves with SPR and conduct sensing via fiber-optic guided-wave technologies. The type of candidate SPR devices disclosed in this invention is related to the periodic optical structures with the distributed feedback (DFB) effect. In such optical structures, within a particular wavelength range, the reflection of the optical fields off the individual component units in the periodic structure constructively interfere with each other, so that a strong reflection is achieved. This effect has been applied in the DFB semiconductor lasers. In the DFB lasers, for achieving single-mode lasing, an additional phase shift section with a length equal to a quarter of the wavelength of the guided-wave is often inserted into the DFB structure, thereby forming a DFB resonant cavity, with the corresponding resonant optical field oscillating around the phase shift section.

How to provide a metallic micro/nano-structure and an optical fiber having a metallic micro/nano-structure on the end-facet, so as to achieve the integration between high-performance SPR devices and optical fibers, has become an important and urgent technical problem to be resolved by a person skilled in the art.

SUMMARY OF THE PRESENT DISCLOSURE

In view of the disadvantages in the prior art, an object of the present disclosure is to provide a metallic micro/nano-structure and an optical fiber having a metallic micro/nano-structure on the end-facet, so as to solve the problems in the prior art that it is difficult to integrate the SPR devices with the optical fibers and the performance of the integrated devices is low.

In order to accomplish the above objects and other related objects, the present disclosure provides a metallic micro/nano-structure, comprising of a metallic film and a micro/nano pattern formed in the metallic film, where the micro/nano pattern divides the metallic film into a periodic structure and a defect structure embedded into the periodic structure, the defect structure locally breaks the periodicity of the periodic structure, in at least one dimension, the periodic structure has a period T that satisfies $0.75\lambda<T<1.25\lambda$, $\lambda$ is a wavelength of a surface plasmon formed at an interface between the metallic film and a medium; and the surface plasmon resonates within the defect structure or within the defect structure and its surrounding area.

Optionally, a second-order Fourier component of a spatial Fourier transform of the periodic structure induces a surface plasmon band gap, the wavelength $\lambda$ is within the band gap, and based on a principle of distributed feedback, the periodic structure does not support the surface plasmon with the wavelength of $\lambda$ to propagate in a certain direction along the interface between the metallic film and the medium.

Optionally, the metallic micro/nano-structure is a DFB resonant cavity structure, wherein the defect structure is a phase shift structure in order to introduce a SPR mode in the form of a defect state in the band gap.

Optionally, when a lightwave having a same frequency as the surface plasmon with the wavelength of $\lambda$ is incident on the metallic micro/nano-structure from a direction normal or inclined to the metallic film, the metallic micro/nano-structure is capable of coupling the incident lightwave to the surface plasmon and producing the surface plasmon resonance.

Optionally, the metallic micro/nano-structure is formed by changing the sizes and/or shapes of one or more component units of what is otherwise an array of periodically arranged component units, these changed component units comprise the defect structure, and the other unchanged component units comprise the periodic structure.

Optionally, changing the size and or shape of a component unit is to change a width of the component unit in at least one dimension.

Optionally, in the dimension, a width W of the defect structure satisfies $0.75L<W<1.25L$, L is a set value satisfying $L=n*\lambda+\lambda/4$, and n is an integer greater than or equal to 0.

Optionally, the periodic structure contains at least either a one-dimensional periodic structure or a two-dimensional periodic structure.

Optionally, the micro/nano pattern comprises of a plurality of nanoslits; the nanoslits penetrate through the metallic film and divide the metallic film into a plurality of metallic film units; part of the metallic film units are periodically arranged to form the periodic structure; and other metallic film units are placed among the periodically arranged metallic film units to form the defect structure.

Optionally, the nanoslit has a width ranging from 5 nm to 200 nm.

Optionally, the periodically arranged metallic film units have a shape of polygon.

Optionally, the polygon is any one of a triangle, a square, a rectangle, and a hexagon.

Optionally, the metallic film has a thickness ranging from 5 nm to 200 nm.

Optionally, a material of the metallic film is Au.

Optionally, in the metallic micro/nano-structure, a plurality of defect structures are embedded into the periodic structure having a constant period, to form a plurality of SPR modes.

Optionally, the metallic micro/nano-structure comprises of a plurality of periodic structures having different periods and their corresponding defect structures, so as to form a plurality of SPR modes.

Optionally, the metallic micro/nano-structure comprises of two periodic structures having different periods and their corresponding defect structures, so as to form two SPR modes which are located near the top surface and the bottom surface of the metallic film respectively.

The present disclosure further provides an optical fiber having a metallic micro/nano-structure on the end-facet, and the metallic micro/nano-structure is any metallic micro/nano-structure described above.

Optionally, an angle between the end-facet and the fiber axis ranges from 82° to 98°.

Optionally, the angle between the end-facet and the fiber axis ranges from 88° to 92°.

Optionally, the end-facet and the metallic micro/nano-structure are connected through an adhesive.

Optionally, the metallic micro/nano-structure is aligned with a core layer of the optical fiber, and it is capable of coupling with an incident fiber guide lightwave to produce the surface plasmon resonance.

Optionally, the optical fiber is a single-mode fiber.

As described above, the metallic micro/nano-structure and the optical fiber having a metallic micro/nano-structure on the end-facet according to the present disclosure have the following beneficial effects:

(1) In the metallic micro/nano-structure according to the present disclosure, the defect structure is embedded into the periodic structure, and the surface plasmons having a wavelength of $\lambda$ that are formed at the interface between the metallic film and the medium resonate within the defect structure or within the defect structure and its surrounding area.

(2) With the same periodic structure, the metallic micro/nano-structure according to the present disclosure not only couples the incident optical waves to the surface plasmons, but also provides distributed feedback to the surface plasmons propagating along the interface between the metallic film and the medium, so as to confine the spatial oscillation of the surface plasmons around the defect structure. The former (coupling) is realized through a first-order spatial Fourier component of the periodic structure, and the latter (confinement) is realized through a second-order spatial Fourier component of the same periodic structure. That is, the metallic micro/nano-structure according to the present disclosure achieves two functions (coupling and confinement) with the same periodic structure, without the need to include an additional confinement structure enclosing the coupling structure. Such devices have simple configurations and are easy to fabricate.

(3) An optical fiber having a metallic micro/nano-structure according to the present disclosure takes the advantages of the single-mode optical fiber systems, including stable optical transmission, compact systems and flexible configurations. It achieves high efficiency coupling between the fiber guided lightwaves and the SPR, using a metallic micro/nano-structure in the form of a DFB resonant cavity. It can be applied in a variety of fiber-optic detection scenarios, for example, measurement of changes in the ambient refractive index and detection of acoustic waves. In particular, by chemically functionalize the gold structures' surfaces to capture specific target molecules in the samples, the measured SPR spectra shall tell information about the molecules, thereby bringing numerous potential applications in biology.

Figure 1A:
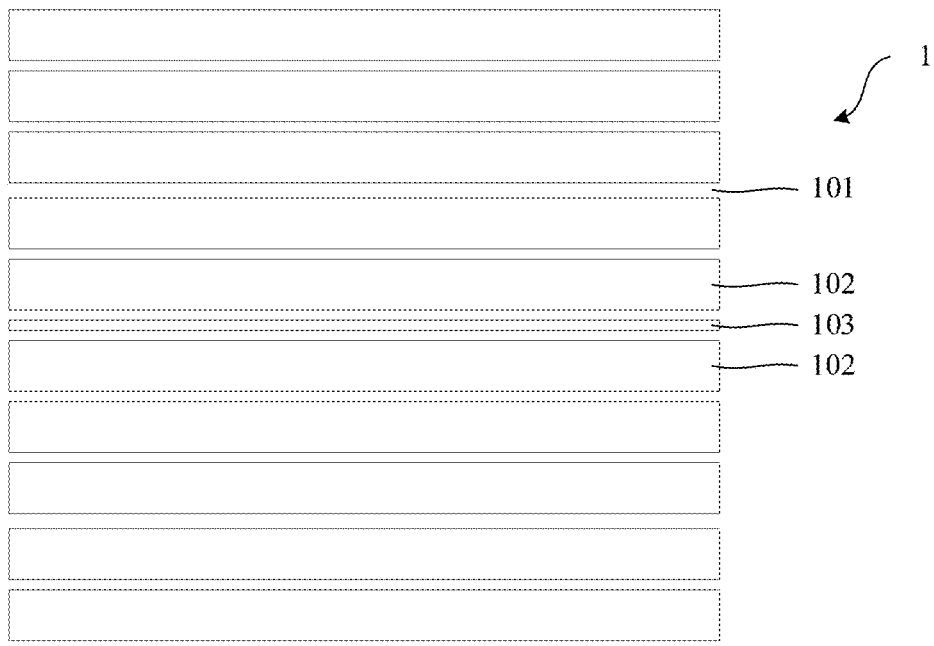
FIGS. 1a and 1b are schematic diagrams of the in-plane geometries of metallic micro/nano-structures according to the present disclosure.

| List of reference numerals | |
|---|---|
| 1 | Metallic micro/nano-structure |
| 101 | Nanoslit |
| 102, 103 | Metallic film unit |
| 2 | Optical fiber |
| a, b, c, d | Dimension of a metallic film unit |
| e, e1, e2 | Period of a two-dimensional periodic structure |
| f, f1, f2 | Width of a defect structure |

DETAILED DESCRIPTION OF THE PREFERRED EMBODIMENTS

Implementations of the present disclosure are illustrated below through specific embodiments. A person skilled in the art can easily understand other advantages and efficacy of the present disclosure according to the content disclosed in this specification. The present disclosure can also be implemented or applied through other different specific implementations. Various modifications or variations can also be made on details in this specification based on different opinions and applications without departing from the spirit of the present disclosure.

Refer to FIGS. 1 to 11. It should be noted that, the figures provided in this embodiment merely illustrate the basic conception of the present disclosure schematically. Therefore, the figures only show components related to the present disclosure, and are not drawn according to the quantity, shapes and sizes of components during actual implementation. The pattern, quantity and ratio of components during actual implementation can be changed arbitrarily, and the component layout may also be more complex.

Embodiment 1

The present disclosure provides a metallic micro/nano-structure, which comprises of a metallic film and a micro/nano pattern formed in the metallic film.

In such a metallic micro/nano-structure, the micro/nano pattern divides the metallic film into a periodic structure and a defect structure embedded into the periodic structure; and the defect structure locally breaks the periodicity of the periodic structure. In at least one dimension, the periodic structure has a period T that satisfies $0.75\lambda < T < 1.25\lambda$, where $\lambda$ is the wavelength of a surface plasmon formed at an interface between the metallic film and a medium. The surface plasmon resonates within the defect structure, or within the defect structure and its surrounding area (about 10 micrometer distance from the defect structure).

It should be noted that, here, $\lambda$ is the wavelength of the surface plasmon formed at the interface between the metallic film and the medium, rather than the wavelength of lightwave with a same frequency in vacuum.

Specifically, the metallic micro/nano-structure is formed by changing the sizes and/or shapes of one or more component units of what is otherwise an array of periodically arranged component units, these changed component units comprise the defect structure, and the other unchanged component units comprise the periodic structure. Changing the size and/or shape of a component unit is to change a width of the component unit in at least one dimension, such as the length or the width.

Specifically, the periodic structure comprises of at least one of a one-dimensional periodic structure and a two-dimensional periodic structure.

Figure 1B:
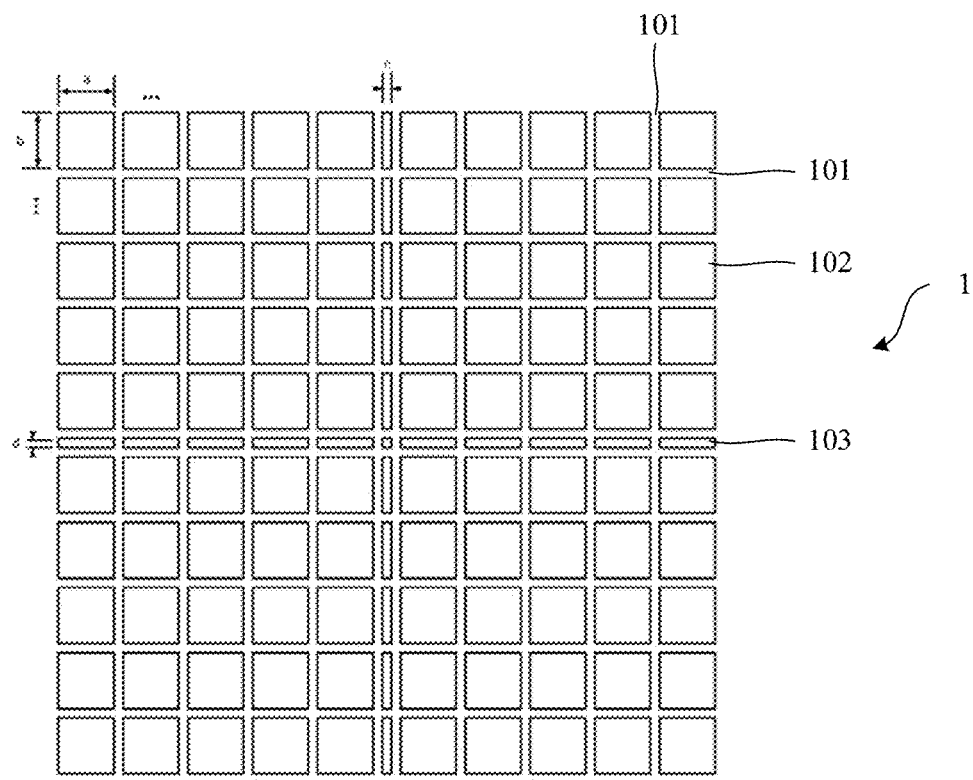

In an example, refer to FIG. 1a and FIG. 1b, which are schematic diagrams of the in-plane geometries of two types of metallic micro/nano-structures 1, respectively. The periodic structure in FIG. 1a is a one-dimensional periodic structure, and the periodic structure in FIG. 1b is a two-dimensional periodic structure.

Specifically, the micro/nano pattern consists of a plurality of nanoslits 101. The nanoslits penetrate through the metallic film, and divide the metallic film into a plurality of units that form the component units of the metallic micro/nano-structure. Some of the metallic film units 102 are periodically arranged to form the periodic structure, while the other metallic film units 103 are placed among the periodically arranged metallic film units to form the defect structure.

In an example, the metallic film has a thickness ranging from 5 nm to 200 nm, and the nanoslits have a width ranging from 5 nm to 200 nm.

In an example, FIG. 1b shows the dimensions a, b, c and d of the metallic film units of a metallic micro/nano-structure, where a is the length, and b is the width of the metallic film units 102 which comprise the two-dimensional periodic structure, and c and d are the respective widths of the metallic film units 103 along two different dimensional directions which comprise the defect structure.

It should be noted that the above-mentioned "length" and "width" are only relative definitions, and the scope of protection of the present disclosure should not be limited by these definitions. For example, the above definitions of length and width for the metallic film units 102, which comprise the two-dimensional periodic structure, by taking the viewing angle of FIG. 1, respectively refer to the widths of the metallic film units 102 in the lateral and longitudinal dimensions. On the other hand, the above definition of width for the metallic film units 103, which comprise the defect structure, refers to the width of the metallic film units 103 in the dimensional direction along which it breaks the periodicity of the two-dimensional periodic structure. So although c and d refer to widths in different dimensions (the lateral dimension and the longitudinal dimension), they both refer to the same kind of widths of the metallic film units 103 which comprise the defect structure.

In this embodiment, the metallic film units 102 which comprise the two-dimensional periodic structure have a square shape, and the metallic film units 103 which comprise the defect structure have a rectangle shape. Therefore, a=b, and c=d. In other embodiments, the metallic film units 102 which comprise the periodic structure may have a rectangle shape, that is, a≠b, and correspondingly, c≠d.

In an example, as shown in FIG. 1a, the defect structure is located in the middle of the one-dimensional periodic structure and divides it into two uniformly periodic parts.

In an example, as shown in FIG. 1b, there are defect structures in both dimensions (the lateral dimension and the longitudinal dimension), and the center of the defect structure is co-located with the center of the periodic structure. In this embodiment, the defect structures in the two dimensional directions are crisscrossed, which divide the periodic structure into four uniformly periodic parts.

The defect structures may be continuous or segmented metallic wires. FIG. 1a and FIG. 1b show geometries in which the defect structures are periodically arranged along one dimensional direction (such as periodically segmented).

Figure 2:
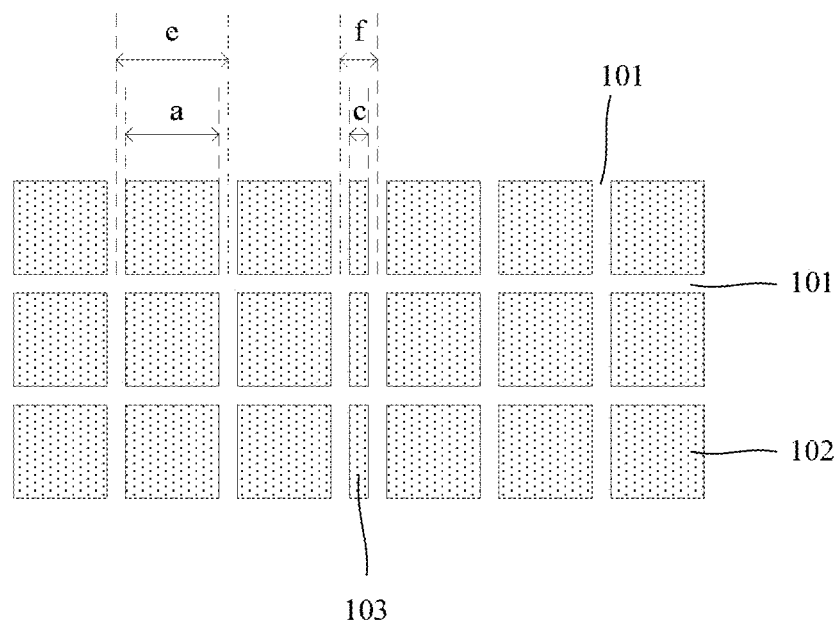
FIG. 2 is a zoom-in view of the structure shown in FIG. 1b.

Please refer to FIG. 2, which is a zoom-in view of the structure shown in FIG. 1b. A period, e, of the two-dimensional periodic structure in the lateral dimension, and a width, f, of the corresponding defect structure are shown.

Specifically, the width of the defect structure, W, satisfies $0.75L < W < 1.25L$, where L is a specified value satisfying $L = n \cdot \lambda + \lambda/4$, where n is an integer greater than or equal to 0.

In this embodiment, e (that is, T) is preferably equal to $\lambda$, and L is preferably equal to $\lambda/4$. Specifically, in FIG. 2, the width, f (that is, W), of the defect structure is preferably equal to e/4.

Figure 3:
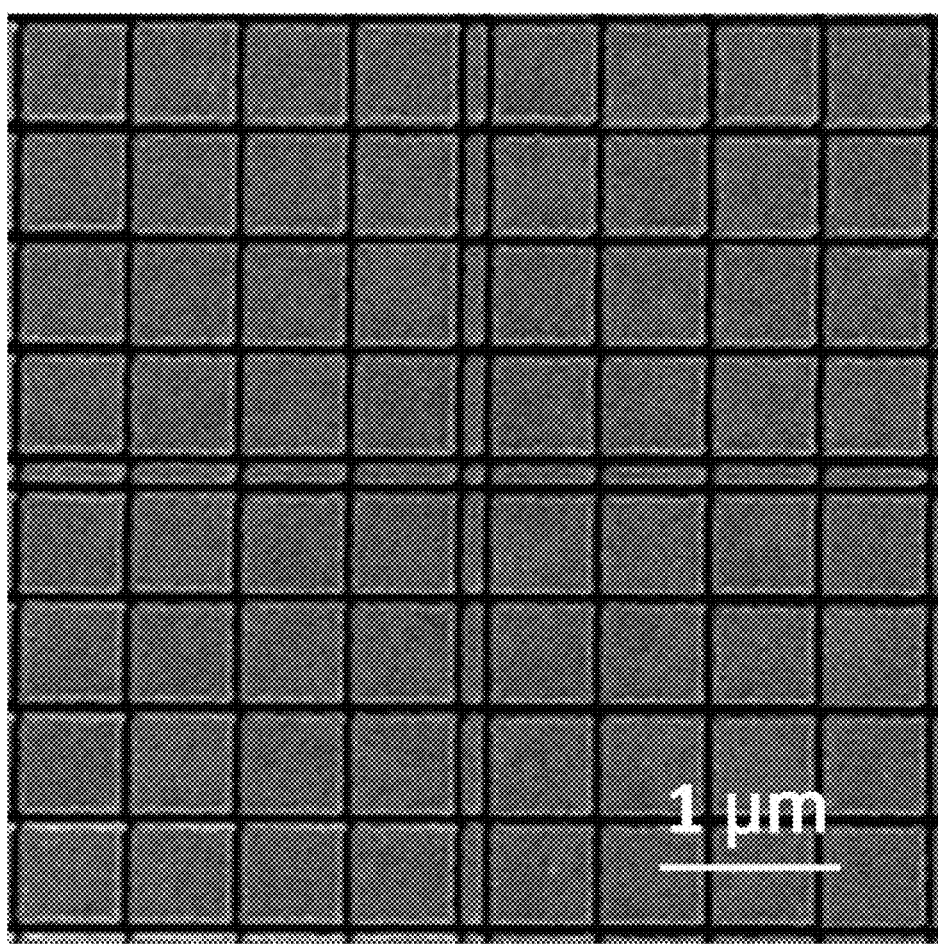
FIG. 3 is a scanning electron micrograph of a central part of a metallic micro/nano-structure in a thin film of gold.
Figure 4:
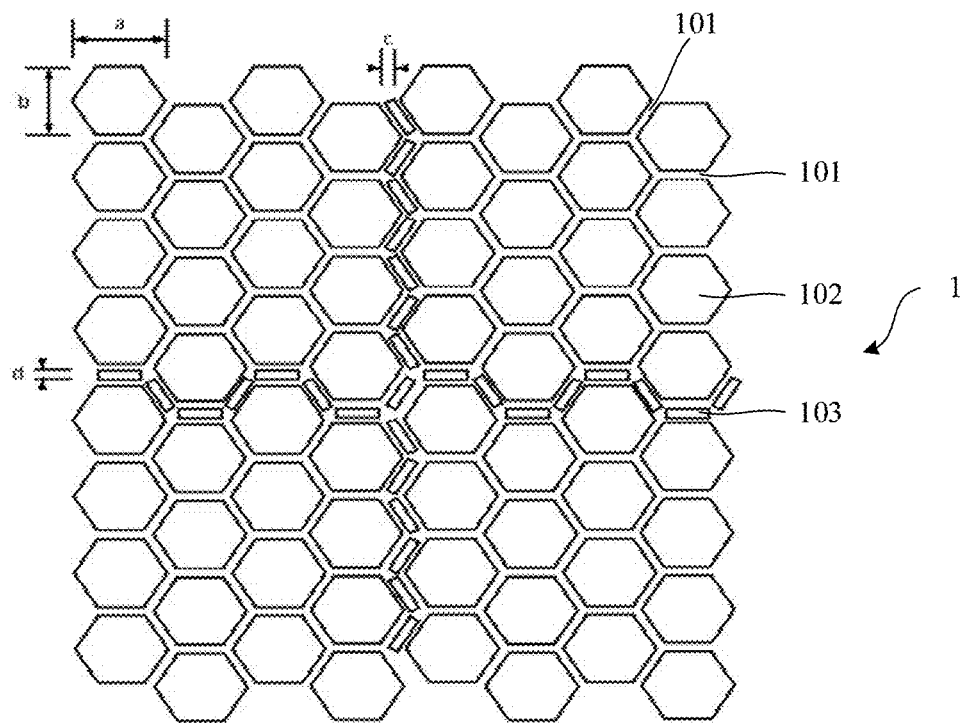
FIGS. 4 and 5 are schematic diagrams of the in-plane geometries of metallic micro/nano-structures according to the present disclosure, in each of which a periodic structure in a metallic film is comprised of hexagonal metallic film units.
Figure 5:
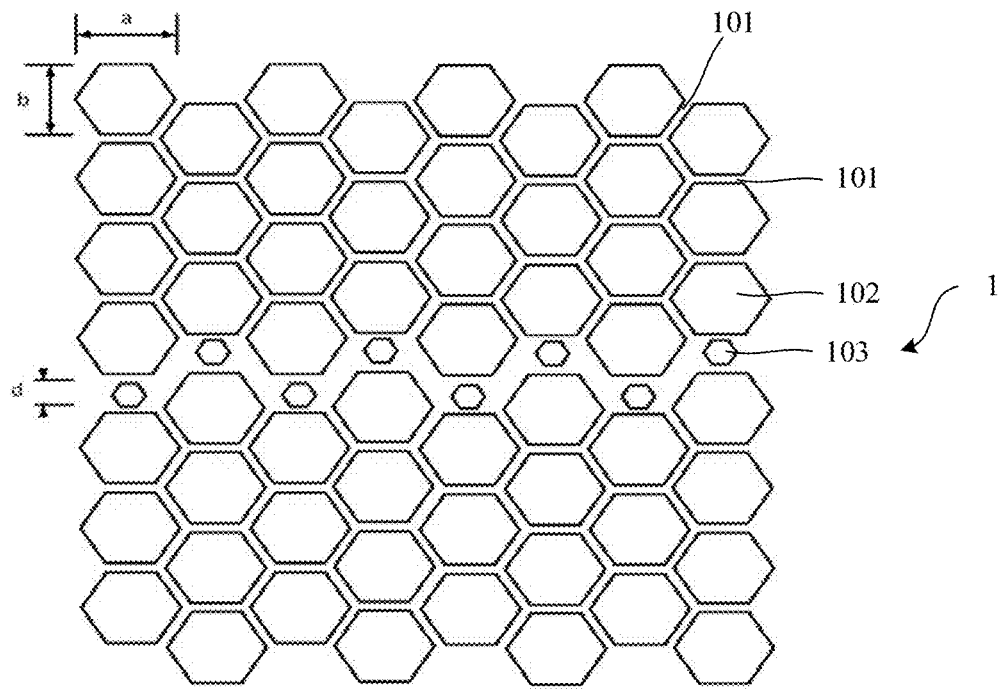

Please refer to FIG. 3, which is a scanning electron micrograph of a central part of a metallic micro/nano-structure in a gold film. In this embodiment, the nanoslits have a width of 50 nm, the periodic structure has a period of 645 nm (corresponding to the SPR wavelength at a gold-water interface which couples to an electromagnetic wave with a free space wavelength of about 850 nm), and the nanoslits have a depth of 55 nm. The gold film is penetrated by the nanosilts, and also has a thickness of 55 nm. In this structure, a band gap for surface plasmons propagating along the gold-water interface is formed, with a corresponding free space wavelength range of 865 nm to 877 nm. The defect structure is located at the center of the periodic metallic micro/nano-structure, whose width is approximately a quarter wavelength of the surface plasmons, and whose gold wire segments have a width of 110 nm. A phase shift section introduces a SPR mode in the form of a defect state within the surface plasmon bandgap.

Described above is just an example. In other embodiments, the period of the periodic structure and the width of the defect structure may be adjusted as required.

In other embodiments, the metallic film unit may have a shape of polygon such as a triangle or a hexagon. Please refer to FIG. 4 and FIG. 5, which are schematic diagrams of the in-plane geometries of metallic micro/nano-structures according to the present disclosure, in each of which a periodic structure in a metallic film is comprised of hexagonal metallic film units 102. The metallic film units 103 which comprise the defect structure may be rectangular (refer to FIG. 4) or hexagonal (refer to FIG. 5). In addition, the defect structures may be embedded into the periodic structures in two dimensions (refer to FIG. 4) or in just one dimension (refer to FIG. 5).

Figure 6:
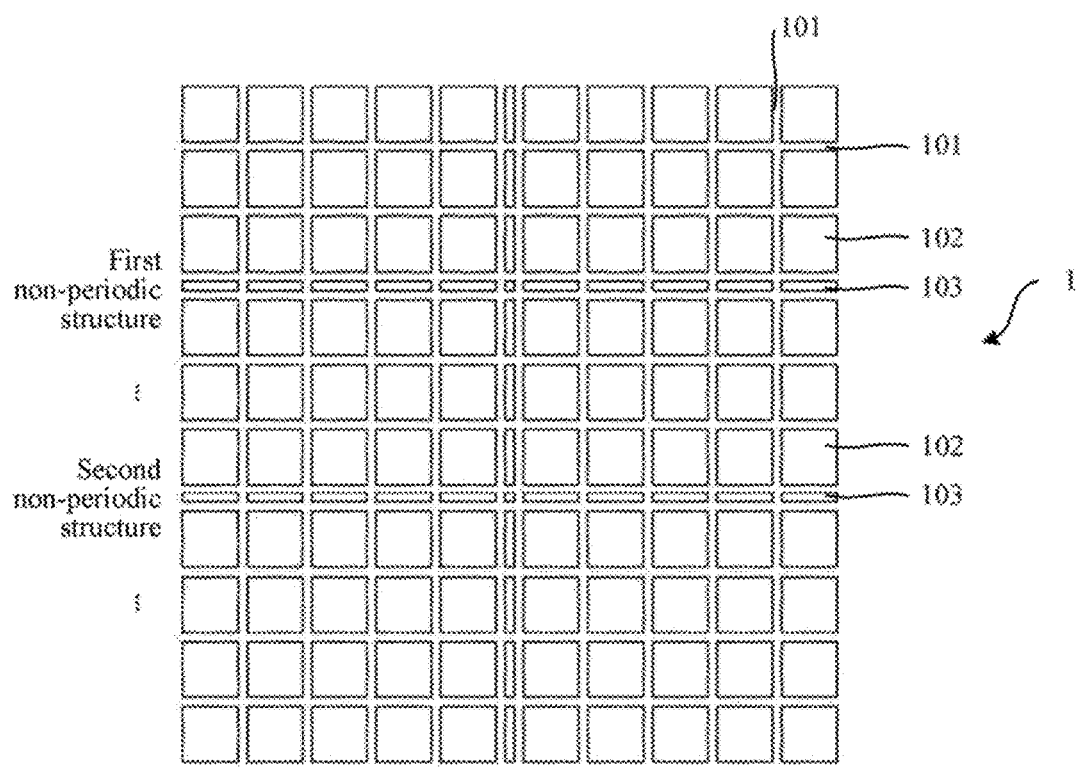
FIG. 6 is a schematic diagram of the in-plane geometry of a metallic micro/nano-structure according to the present disclosure, in which a plurality of defect structures are embedded into a periodic structure that has a constant period.

The metallic micro/nano-structure according to the present disclosure may be implemented in many other manners:

For example, referring to FIG. 6, which is a schematic diagram of the in-plane geometry of a metallic micro/nano-structure 1, in which a plurality of defect structures are embedded into a periodic structure that has a constant period. A plurality of SPR modes can be formed in such a structure.

The metallic micro/nano-structure according to the present disclosure may further comprise of a plurality of periodic structures with different periods and their corresponding defect structures, in which a plurality of SPR modes can be formed. For example, when the metallic micro/nano-structure comprises of two periodic structures with different periods and their corresponding defect structures, and when each periodic structure with its defect structure has the one-dimensional geometry as shown in FIG. 1a, the two periodic structures can be arranged in parallel or orthogonal to each other. In the case of orthogonal arrangement, with different periods and different defect widths of the two periodic structures, two SPR modes with different polarizations and different wavelengths can be formed.

Figure 7:
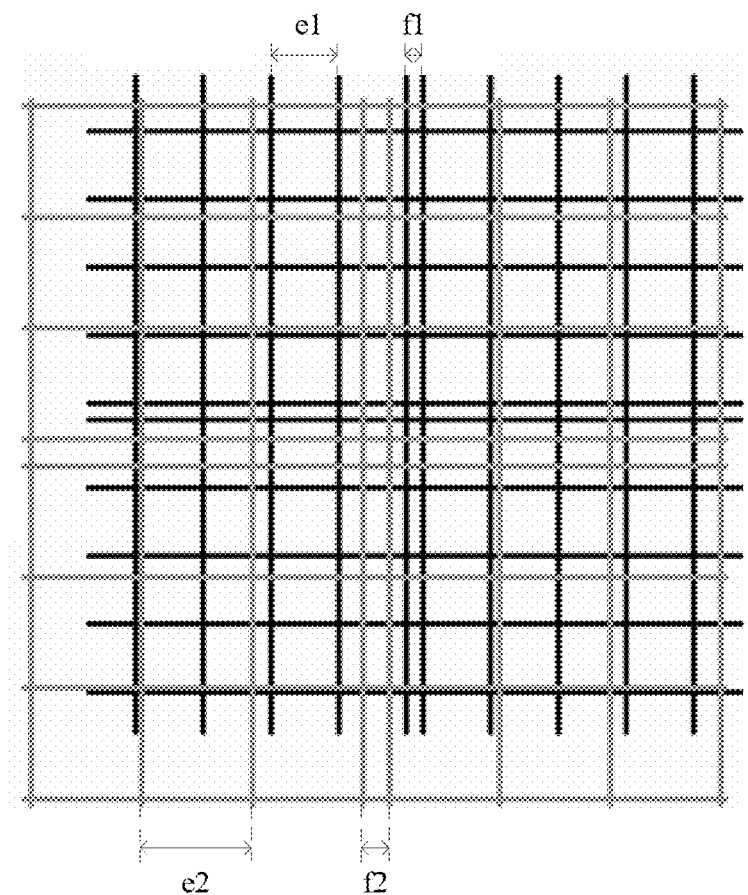
FIG. 7 is a schematic diagram of the in-plane geometry of a metallic micro/nano-structure according to the present disclosure, in which the metallic micro/nano-structure contains two periodic structures with different periods and the corresponding defect structures.

Particularly, referring to FIG. 7, which is a schematic diagram of the in-plane geometry of a metallic micro/nano-structure 1, in which the metallic micro/nano-structure 1 contains two two-dimensional periodic structures with two different periods (e1 and e2) and the corresponding defect structures (with widths of f1 and f2 respectively). Such a structure can be applied to form two designated SPR modes which locate at the top and bottom surfaces of the metallic film respectively.

It should be noted that, in cases where there are two periodic structures with two different periods which correspond to SPR modes at the top and bottom surfaces of the metallic film respectively, we may design each periodic structure to have a corresponding defect structure as in the foregoing embodiment, while in other embodiments, we may as well let only one periodic structure have a corresponding defect structure, and let the other periodic structure be uniformly periodic (without any defect structures embedded).

Described above is just an example, and the protection scope of the present disclosure should not be excessively limited herein.

In the metallic micro/nano-structure according to the present disclosure, a defect structure is embedded into a periodic structure, and the defect structure locally breaks the periodicity of the periodic structure. A second-order Fourier component of a spatial Fourier transform of the periodic structure induces a surface plasmon band gap, the wavelength $\lambda$ is within the band gap. Based on a principle of distributed feedback, the periodic structure does not support surface plasmons with the wavelength of $\lambda$ to propagate along the interface between the metallic film and the medium. Further, the defect structure is a phase shift structure in order to introduce a SPR mode which is in the form of a defect state in the surface plasmon band gap, so that the metallic micro/nano-structure becomes a DFB resonant cavity. When lightwaves having a same frequency as the surface plasmons with the wavelength of $\lambda$ are incident on the metallic micro/nano-structure from a direction normal or inclined to the metallic film, the metallic micro/nano-structure is capable of coupling the incident lightwaves to the surface plasmons and producing surface plasmon resonance within the defect structure and its surrounding area.

With the same periodic structure, the metallic micro/nano-structure according to the present disclosure not only couples the incident optical waves to the surface plasmons, but also provides distributed feedback to the surface plasmons propagating along the interface between the metallic film and the medium, so as to confine the spatial oscillation of the surface plasmons around the defect structure. The former (coupling) is realized through a first-order spatial Fourier component of the periodic structure, and the latter (confinement) is realized through a second-order spatial Fourier component of the same periodic structure. That is, the metallic micro/nano-structure according to the present disclosure achieves two functions (coupling and confinement) with the same periodic structure, without the need to include an additional confinement structure enclosing the coupling structure. Such devices have simple configurations and are easy to fabricate.

Embodiment 2

The present disclosure further provides an optical fiber having a metallic micro/nano-structure on the end-facet. The metallic micro/nano-structure is the metallic micro/nano-structure according to Embodiment 1.

Figure 8:
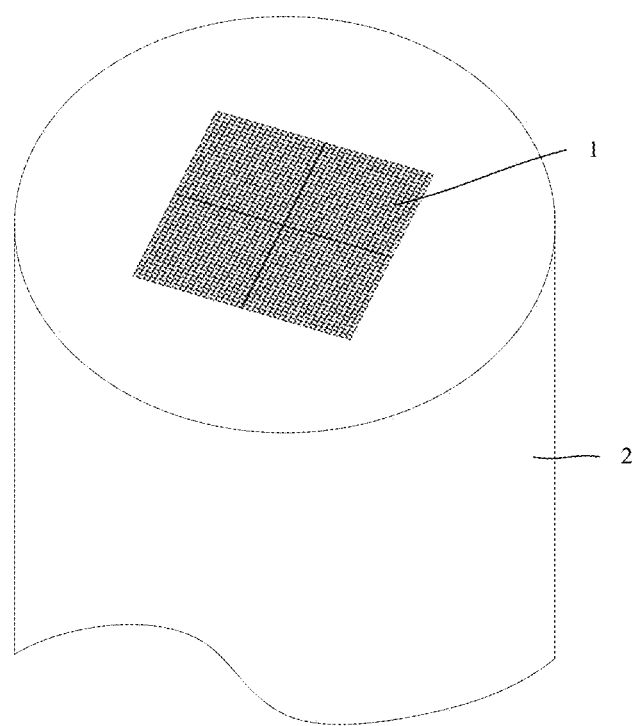
FIG. 8 is a schematic diagram of an optical fiber having a metallic micro/nano-structure on the end-facet according to the present disclosure.

Please refer to FIG. 8, which is a schematic diagram of an optical fiber having a metallic micro/nano-structure on the end-facet.

Specifically, an angle between the end-facet and the fiber axis ranges from 82° to 98°. That is, the end-facet is a fiber end-facet substantially perpendicular to the optical fiber 2. In this embodiment, an angle between the end-facet and the fiber axis is preferably 88° to 92°.

In this embodiment, the optical fiber 2 is preferably a single-mode fiber (for example, 780-HP from Nufern). The metallic micro/nano-structure 1 is aligned with a core layer of the optical fiber 2, and is used to couple with incident fiber guided lightwaves so as to produce surface plasmon resonance within the defect structure or within the defect structure and its surrounding area.

In this embodiment, for example, the metallic micro/nano-structure has an overall size of 50×50 μm2, which is positioned right on the top of the core layer part of the end-facet of the optical fiber. When the fiber guided lightwave mode illuminates the metallic micro/nano-structure, the defect state surface plasmon resonance will be excited. In other embodiments, the overall size of the metallic micro/nano-structure may be adjusted as required, and the protection scope of the present disclosure should not be excessively limited herein.

Specifically, the end-facet and the metallic micro/nano-structure 1 can be bound together through an adhesive (not shown in the figures). The adhesive is preferably a material that can be cured by ultraviolet illumination.

In an example, the adhesive is methyl acrylate (such as NOA81 from Norland), which, at the same time, is transparent to the optical wavelengths for sensing. This adhesive has an ultraviolet wavelength range for curing from 100 nm to 400 nm, a curing light intensity range from 1 J/cm2 to 2000 J/cm2, and a curing time range from 5 s to 600 s.

An optical fiber having a metallic micro/nano-structure according to the present disclosure takes the advantages of the single-mode optical fiber systems, including stable optical transmission, compact systems and flexible configurations. It achieves high efficiency coupling between the fiber guided lightwaves and the SPR, using a metallic micro/nano-structure in the form of a DFB resonant cavity. It can be applied in a variety of fiber-optic detection scenarios, for example, measurement of changes in the ambient refractive index and detection of acoustic waves. In particular, by chemically functionalize the gold structures' surfaces to capture specific target molecules in the samples, the measured SPR spectra shall tell information about the molecules, thereby bringing numerous potential applications in biology.

Embodiment 3

In this embodiment, an optical fiber having a metallic micro/nano-structure on the end-facet in Embodiment 2 is used for a refractive index measurement experiment.

Figure 9:
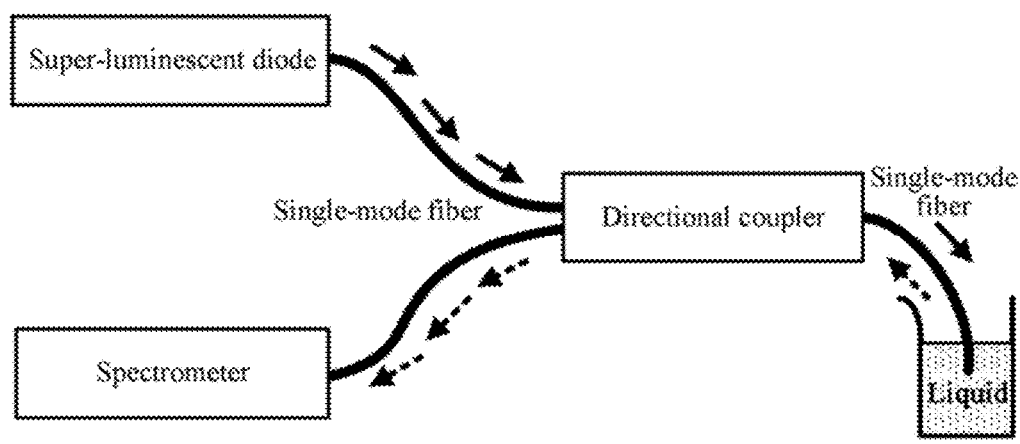
FIG. 9 is a schematic diagram of an experimental setup that measures the refractive indices of liquid samples by using an optical fiber having a metallic micro/nano-structure on the end-facet according to the present disclosure.

Please refer to FIG. 9, which is a schematic diagram of an experimental setup that measures the refractive indices of liquid samples by using an optical fiber having a metallic micro/nano-structure on the end-facet according to the present disclosure. An optical fiber end-facet having a metallic micro/nano-structure is immersed into the liquid samples. The single-mode optical fiber used in the experiment has a working wavelength range from 780 nm to 970 nm. The light source used in the experiment is a super-luminescent diode (SLD), which is a broadband light source. The output light from the light source is routed by a 50%:50% optical fiber directional coupler into the liquid samples, and the reflected light thereof is routed by the same directional coupler into a fiber-optic CCD spectrometer for analysis.

Figure 10:
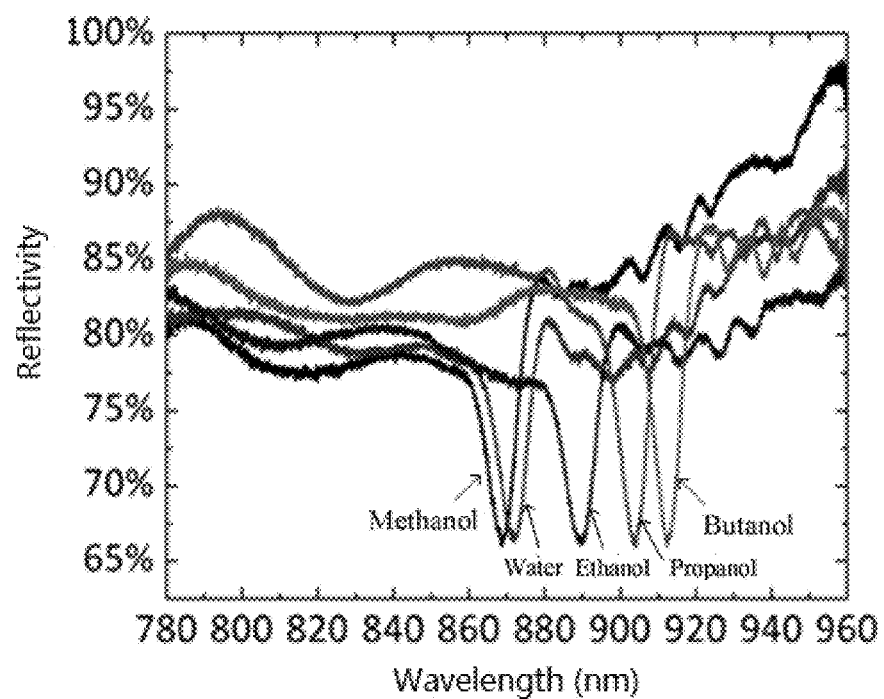
FIG. 10 is the normalized reflection spectra for methanol, water, ethanol, propanol, and butanol samples.
Figure 11:
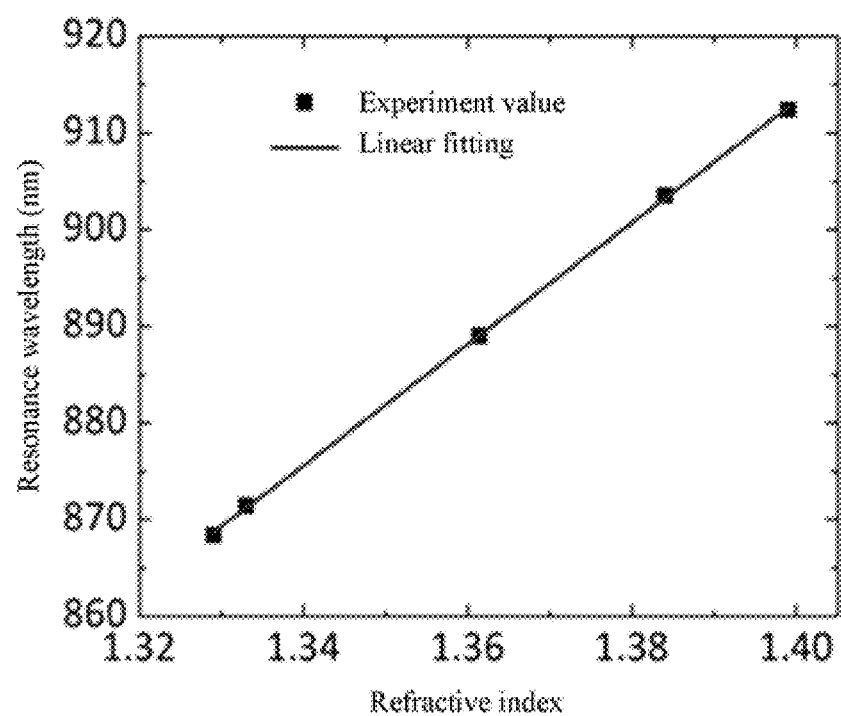
FIG. 11 is SPR resonance wavelength versus refractive index for the liquid samples.

Specifically, five liquid samples have been measured, including methanol, water, ethanol, propanol and butanol, with the respective normalized reflection spectra shown in FIG. 10. Plotting the experimental values of SPR resonance wavelength versus liquid refractive index, we obtain the scattered points in FIG. 11. It shows a linear relationship between the resonance wavelength and the refractive index. A linear fitting gives a sensitivity as high as 628 nm RIU-1.

In addition, the ambient pressure of the optical fiber end-facet may alternatively be measured by having substances near the optical fiber end-facet whose refractive index changes with pressure. For example, the pressure may result from a sound wave, an ultrasonic wave or an infrasonic wave in a liquid, and the substance may be the adhesive or another material between the metallic micro/nano-structure and the optical fiber end-facet, or a material which has been additionally deposited on the metallic surface and/or the optical fiber end-facet.

In conclusion, in the metallic micro/nano-structure according to the present disclosure, the defect structure is embedded into the periodic structure, and the surface plasmons having a wavelength of $\lambda$ that are formed at the interface between the metallic film and the medium resonate within the defect structure or within the defect structure and its surrounding area. With the same periodic structure, the metallic micro/nano-structure according to the present disclosure not only couples the incident optical waves to the surface plasmons, but also provides distributed feedback to the surface plasmons propagating along the interface between the metallic film and the medium, so as to confine the spatial oscillation of the surface plasmons around the defect structure. The former (coupling) is realized through a first-order spatial Fourier component of the periodic structure, and the latter (confinement) is realized through a second-order spatial Fourier component of the same periodic structure. That is, the metallic micro/nano-structure according to the present disclosure achieves two functions (coupling and confinement) with the same periodic structure, without the need to include an additional confinement structure enclosing the coupling structure. Such devices have simple configurations and are easy to fabricate. An optical fiber having a metallic micro/nano-structure according to the present disclosure takes the advantages of the single-mode optical fiber systems, including stable optical transmission, compact systems and flexible configurations. It achieves high efficiency coupling between the fiber guided lightwaves and the SPR, using a metallic micro/nano-structure in the form of a DFB resonant cavity. It can be applied in a variety of fiber-optic detection scenarios, for example, measurement of changes in the ambient refractive index and detection of acoustic waves. In particular, by chemically functionalize the gold structures' surfaces to capture specific target molecules in the samples, the measured SPR spectra shall tell information about the molecules, thereby bringing numerous potential applications in biology. Therefore, the present disclosure effectively overcomes various disadvantages in the prior art and hence has a high value for industrial application.

The foregoing embodiments are only to illustrate the principle and efficacy of the present disclosure exemplarily, and are not to limit the present disclosure. Any person skilled in the art can make modifications or variations on the foregoing embodiments without departing from the spirit and scope of the present disclosure. Accordingly, all equivalent modifications or variations completed by those with ordinary skill in the art without departing from the spirit and technical thinking disclosed by the present disclosure should fall within the scope of claims of the present disclosure.

What is claimed is:

1. A metallic micro/nano-structure, comprising of a metallic film and a micro/nano pattern formed in the metallic film, wherein
the micro/nano pattern divides the metallic film into a periodic structure and a defect structure embedded into the periodic structure, the defect structure locally breaks the periodicity of the periodic structure, in at least one dimension, the periodic structure has a period T that satisfies $0.75\lambda < T < 1.25\lambda$, $\lambda$ is a wavelength of a surface plasmon formed at an interface between the metallic film and a medium; and the surface plasmon resonates within the defect structure or within the defect structure and its surrounding area.

2. The metallic micro/nano-structure according to claim 1, wherein a second-order Fourier component of a spatial Fourier transform of the periodic structure induces a surface plasmon band gap, the wavelength $\lambda$ is within the band gap, and based on a principle of distributed feedback, the periodic structure does not support the surface plasmon with the wavelength of $\lambda$ to propagate in a certain direction along the interface between the metallic film and the medium.

3. The metallic micro/nano-structure according to claim 2, wherein the metallic micro/nano-structure is a distributed feedback resonant cavity structure, wherein the defect structure is a phase shift structure in order to introduce a surface plasmon resonance mode which is in the form of a defect state in the band gap.

4. The metallic micro/nano-structure according to claim 1, wherein when a lightwave having a same frequency as the surface plasmon with the wavelength of $\lambda$ is incident on the metallic micro/nano-structure from a direction normal or inclined to the metallic film, the metallic micro/nano-structure is capable of coupling the incident lightwave to the surface plasmon and producing the surface plasmon resonance.

5. The metallic micro/nano-structure according to claim 1, wherein the metallic micro/nano-structure is formed by changing the sizes and/or shapes of one or more component units of what is otherwise an array of periodically arranged component units, these changed component units comprise the defect structure, and the other unchanged component units comprise the periodic structure.

6. The metallic micro/nano-structure according to claim 5, wherein changing the size and/or shape of a component unit is to change a width of the component unit in at least one dimension.

7. The metallic micro/nano-structure according to claim 1, wherein in the dimension, a width W of the defect structure satisfies $0.75L<W<1.25L$, wherein L is a set value satisfying $L=n\cdot\lambda+\lambda/4$, where n is an integer greater than or equal to 0.

8. The metallic micro/nano-structure according to claim 1, wherein the periodic structure contains at least either a one-dimensional periodic structure or a two-dimensional periodic structure.

9. The metallic micro/nano-structure according to claim 1, wherein the micro/nano pattern comprises of a plurality of nanoslits; the nanoslits penetrate through the metallic film and divide the metallic film into a plurality of metallic film units; part of the metallic film units are periodically arranged to form the periodic structure; and the other metallic film units are placed among the periodically arranged metallic film units to form the defect structure.

10. The metallic micro/nano-structure according to claim 9, wherein the nanoslit has a width ranging from 5 nm to 200 nm.

11. The metallic micro/nano-structure according to claim 9, wherein the periodically arranged metallic film units have a shape of polygon.

12. The metallic micro/nano-structure according to claim 11, wherein the polygon is any one of a triangle, a square, a rectangle, and a hexagon.

13. The metallic micro/nano-structure according to claim 1, wherein the metallic film has a thickness ranging from 5 nm to 200 nm.

14. The metallic micro/nano-structure according to claim 1, wherein a material of the metallic film is Au.

15. The metallic micro/nano-structure according to claim 1, wherein in the metallic micro/nano-structure, a plurality of defect structures are embedded into the periodic structure having a constant period, to form a plurality of surface plasmon resonance modes.

16. The metallic micro/nano-structure according to claim 1, wherein the metallic micro/nano-structure comprises of a plurality of periodic structures having different periods and their corresponding defect structures, so as to form a plurality of surface plasmon resonance modes.

17. The metallic micro/nano-structure according to claim 16, wherein the metallic micro/nano-structure comprises of two periodic structures having different periods and their corresponding defect structures, so as to form two surface plasmon resonance modes which are located near the top surface and the bottom surface of the metallic film respectively.

18. An optical fiber having a metallic micro/nano-structure on the end-facet, wherein the metallic micro/nano-structure is the metallic micro/nano-structure according to claim 1.

19. The optical fiber having a metallic micro/nano-structure on the end-facet according to claim 18, wherein an angle between the end-facet and the fiber axis ranges from 82° to 98°.

20. The optical fiber having a metallic micro/nano-structure on the end-facet according to claim 19, wherein an angle between the end face and the fiber axis ranges from 88° to 92°.

21. The optical fiber having a metallic micro/nano-structure on the end-facet according to claim 18, wherein the end-facet and the metallic micro/nano-structure are connected through an adhesive.

22. The optical fiber having a metallic micro/nano-structure on the end-facet according to claim 18, wherein the metallic micro/nano-structure is aligned with a core layer of the optical fiber, and it is capable of coupling with an incident fiber guided lightwave to produce the surface plasmon resonance.

23. The optical fiber having a metallic micro/nano-structure on the end-facet according to claim 18, wherein the optical fiber is a single-mode fiber.

* * * * *